(12) United States Patent
Thelen

(10) Patent No.: US 9,677,704 B1
(45) Date of Patent: Jun. 13, 2017

(54) MOBILE TELEPHONE HOLDER AND DISPLAY

(71) Applicant: Joseph M. Thelen, Leawood, KS (US)

(72) Inventor: Joseph M. Thelen, Leawood, KS (US)

(*) Notice: Subject to any disclaimer, the term of this patent is extended or adjusted under 35 U.S.C. 154(b) by 48 days.

(21) Appl. No.: 14/065,956

(22) Filed: Oct. 29, 2013

Related U.S. Application Data

(60) Provisional application No. 61/821,436, filed on May 9, 2013.

(51) Int. Cl.
*F16M 13/00* (2006.01)
*F16M 11/00* (2006.01)

(52) U.S. Cl.
CPC ............ *F16M 13/00* (2013.01); *F16M 11/00* (2013.01)

(58) Field of Classification Search
CPC ..... G06F 1/1628; G06F 1/1626; F16M 13/00; F16M 11/10; F16M 11/105; F16M 11/2021; F16M 11/38; A45C 11/00; A45C 7/0036
USPC .... 248/444, 444.1, 445, 450, 451, 456, 459, 248/469, 121
See application file for complete search history.

(56) References Cited

U.S. PATENT DOCUMENTS

| | | | | |
|---|---|---|---|---|
| 1,169,869 A | * | 2/1916 | Richards | A47B 23/042 211/42 |
| 1,812,318 A | * | 6/1931 | Bower | A47F 7/02 211/37 |
| 2,561,173 A | * | 7/1951 | Bompart | B60Q 7/005 116/63 P |
| 2,726,835 A | * | 12/1955 | Hummel | A47F 5/112 211/73 |
| 3,599,925 A | * | 8/1971 | Dubler | A47B 97/04 248/352 |
| D289,233 S | * | 4/1987 | Cadman | D6/310 |
| 5,979,097 A | * | 11/1999 | Moore | G09F 1/12 40/124.03 |
| D510,517 S | * | 10/2005 | Noack | D8/373 |
| 6,981,682 B2 | * | 1/2006 | Kind | A47B 23/042 248/300 |
| D526,357 S | * | 8/2006 | Killinger | D19/90 |
| 7,694,932 B1 | * | 4/2010 | Ngan | B42D 5/043 206/45.2 |
| 7,861,995 B2 | * | 1/2011 | Liou | F16M 11/105 248/454 |

(Continued)

OTHER PUBLICATIONS

Black Cell Phone Stand http://www.cellphoneshop.net/bkstand.html?cagpspn=pla &gclid=CMOP2eP7wLUCFYqf4AodZVYApQm Accessed Feb. 20, 2013.

(Continued)

*Primary Examiner* — Muhammad Ijaz
(74) *Attorney, Agent, or Firm* — Robert C. Montgomery; Montgomery Patent & Design LP.

(57) ABSTRACT

A device adapted to hold and display a mobile telephone or digital device and formed into an operative shape comprising a front face set upon a first plane oriented at an acute first angle from horizontal, a back face set upon a second plane oriented at an acute second angle from horizontal, a sill disposed horizontally and joined to the front face, and a reveal disposed at an upward acute angle from horizontal and operatively joined to the sill, such that the front face, sill and reveal form a trough and that a mobile device lays against and is supported upon the front face, and the reveal retains the mobile device in the trough.

4 Claims, 6 Drawing Sheets

(56) References Cited

U.S. PATENT DOCUMENTS

| | | | |
|---|---|---|---|
| D646,903 S * | 10/2011 | Santana | D6/310 |
| D651,213 S * | 12/2011 | Magness | D14/447 |
| D664,528 S | 7/2012 | Chen et al. | |
| D666,174 S * | 8/2012 | Du | D14/217 |
| 8,424,829 B2 * | 4/2013 | Lu | A45C 7/0036 |
| | | | 248/152 |
| 8,424,830 B2 * | 4/2013 | Yang | A47B 23/044 |
| | | | 248/459 |
| D693,826 S * | 11/2013 | Ashida | D14/447 |
| 8,888,058 B2 * | 11/2014 | Zaharakis | F16M 11/22 |
| | | | 248/176.1 |
| 2010/0090085 A1 * | 4/2010 | Corrion | A47B 23/043 |
| | | | 248/459 |
| 2010/0282924 A1 * | 11/2010 | Boies | A47B 23/042 |
| | | | 248/163.1 |
| 2012/0241581 A1 | 9/2012 | Chung | |
| 2012/0261365 A1 * | 10/2012 | Tello | B42D 25/22 |
| | | | 211/50 |
| 2012/0305502 A1 | 12/2012 | Haarburger | |
| 2012/0305735 A1 | 12/2012 | McSweyn | |
| 2012/0312953 A1 * | 12/2012 | Moffa | A47B 23/044 |
| | | | 248/459 |
| 2012/0318950 A1 * | 12/2012 | Wilber | A47B 23/043 |
| | | | 248/459 |
| 2013/0001379 A1 * | 1/2013 | Hobbs | F16M 11/10 |
| | | | 248/126 |
| 2013/0026329 A1 * | 1/2013 | Lane | A47B 23/043 |
| | | | 248/459 |
| 2013/0134282 A1 * | 5/2013 | Negretti | A47B 23/04 |
| | | | 248/450 |
| 2014/0097319 A1 * | 4/2014 | Robinson | A47B 23/043 |
| | | | 248/456 |
| 2014/0151524 A1 * | 6/2014 | Katterheinrich | F16M 11/10 |
| | | | 248/456 |
| 2014/0153182 A1 * | 6/2014 | North | G06F 1/1632 |
| | | | 361/679.41 |
| 2014/0165366 A1 * | 6/2014 | Hochman | H04M 1/04 |
| | | | 29/525.01 |
| 2016/0015168 A1 * | 1/2016 | Sun | F16M 13/00 |
| | | | 248/447.1 |
| 2016/0142523 A1 * | 5/2016 | Bartkowski | H04M 1/04 |
| | | | 248/441.1 |
| 2016/0223126 A1 * | 8/2016 | Mireles | F16M 11/046 |

OTHER PUBLICATIONS

IPhone Stand and Case Set. http://www.etsy.com/listing/112434164/iphone-stand-case-set Accessed Feb. 20, 2013.

* cited by examiner

MOBILE TELEPHONE HOLDER AND DISPLAY

RELATED APPLICATIONS

The present invention was first described in and claims the benefit of U.S. Provisional Application No. 61/821,436, filed May 9, 2013, the entire disclosures of which are incorporated herein by reference.

FIELD OF THE INVENTION

The present invention relates to a holder and display device for mobile telephones and digital devices.

BACKGROUND OF THE INVENTION

Mobile telephones, smart phones, tablets and PDA's are becoming the norm in digital data communication and interaction. These devices are based around providing the user with wide ranging interactive digital video information, this means they provide a display presentation that requires direct physical input from the user in response to the presented display. Often when the user is not holding the device they place the device down on a flat surface such as a desk top or counter. In doing so, when the device presents new information to the user, or when the user decides to operate the device, they must pick it up, orient it to best see the display screen and hold it while interacting with it. Then when the user completes the momentary interaction with the device, it is returned to the flat surface only to repeat the process for the next interactive event. This repeated operation becomes clumsy, bothersome, and time consuming. Similarly, placing the mobile device on a desk top or counter exposes them to damage or loss by accidental spills, having objects set upon them, having them pushed or knocked to the floor, or any of a variety of possible negative events.

Accordingly, there exists a need for a means to hold or cradle the mobile telephone or other digital device in such a manner that it could be easily observed at all times and then be physically interacted with without having to constantly pick it up to use it. Additionally, filling this need would allow the user to quickly and efficiently monitor the device display at all times by a simple glance rather than taking the time to pick it up, and it would be removed from the desk top or counter thereby avoiding accidental damage to the mobile device.

SUMMARY OF THE INVENTION

The disadvantages of the prior art are overcome by the present invention in providing a mobile telephone holder and display device that is adapted to hold a digital device in an upright observable position that allows the user to physically touch it and operate it without having to remove it from the device. One (1) embodiment of the device is defined as a singular monolithic main body piece that is operatively formed into its specific shape. The device comprises a front face, a back face, a sill, and a reveal. The front face, sill, and reveal forming at trough that supports the mobile device in an upright and secure position. The reveal is set at the front edge of the sill to prevent the mobile device from sliding and may include a slot or recess in its upper surface to better cradle the end of the mobile device. Another embodiment allows that the present invention be constructed of individual pieces operatively joined rather than as a monolithic piece operatively bent to form the device. The present invention also includes pads on the bottom of the sill to prevent the device from sliding.

The device of the preset invention further includes the opportunity to accept advertising or business indicia on its faces and an additional embodiment further includes a back keep that is a secondary back surface set in close proximity to the back face to allow the insertion of printed materials. The device of the present invention may be constructed of any of a group of materials that is transparent, translucent, or colored.

Thus, the present invention provides a mobile telephone holder and display device that overcomes the drawbacks and disadvantages of the prior art by holding a mobile device in an upright and supported manner, such that the user can see the display and all times and physically interact with the device without having to find it, pick it up, orient it, interact with it and set it back down over and over. Additionally, the present invention holds a mobile device up off of the surface of a deck or counter preventing accidental damage by errant spills or from being crushed or from being inadvertently knocked to the floor.

Other objects, features and advantages of the present invention will be readily appreciated, as the same becomes better understood after reading the subsequent description taken in connection with the accompanying drawings.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
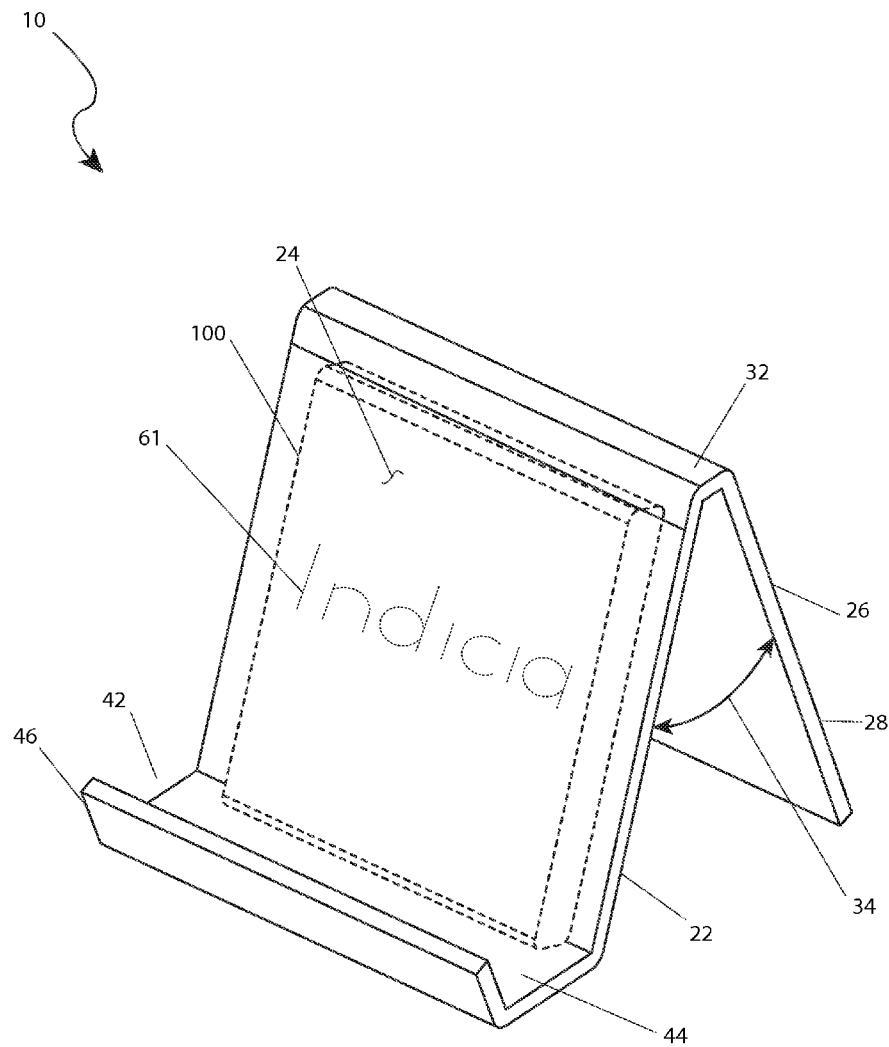
FIG. 1 is a perspective view of a mobile telephone holder and display 10 in accordance with the preferred embodiment of the present invention.

DESCRIPTIVE KEY 10 mobile telephone holder and display
12 alternate embodiment
22 first plane
24 front face
24a front face upper end
24b front face lower end
26 second plane
28 back face
28a back face upper end
28b back face lower end
32 bridge
34 support angle
42 trough 44 sill
44a sill front edge
44b sill rear edge
46 reveal
46a reveal front edge
46b reveal rear edge
48 slot
52 pad
61 face indicia
62 back indicia
74 fold
76 third plane
78 back keep face
78a keep
100 mobile device
105 horizontal surface

DETAILED DESCRIPTION OF THE PREFERRED EMBODIMENT

Figure 4:
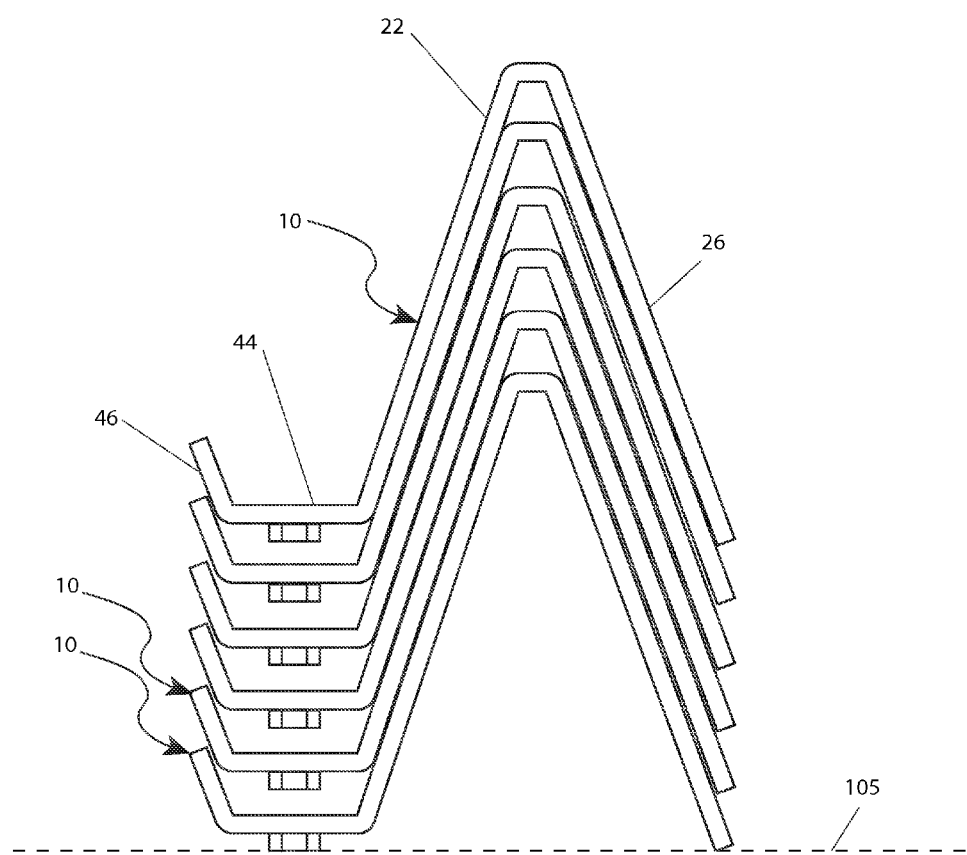
FIG. 4 is a side elevation view of a stack of a plurality of mobile telephone holders 10 in accordance with the preferred embodiment of the present invention.
Figure 5:
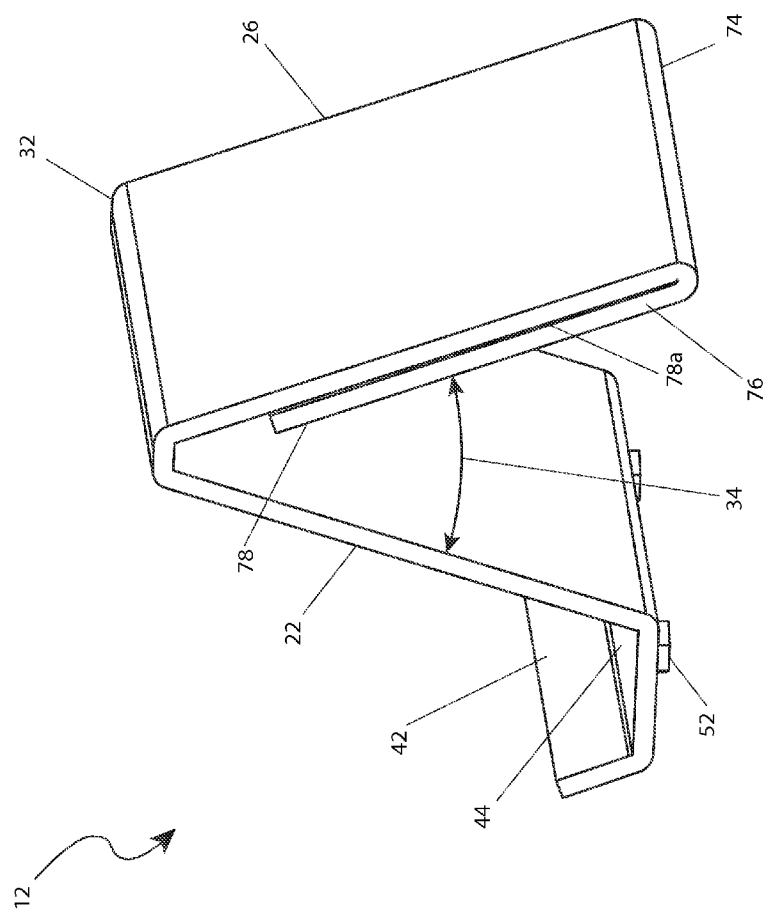
FIG. 5 is a perspective view of a mobile telephone holder and display 12 in accordance with an alternate embodiment of the present invention; and, FIG. 6 is a side elevation view of a stack of a plurality of mobile telephone holders 12 in accordance with an alternate embodiment of the present invention.
Figure 6:
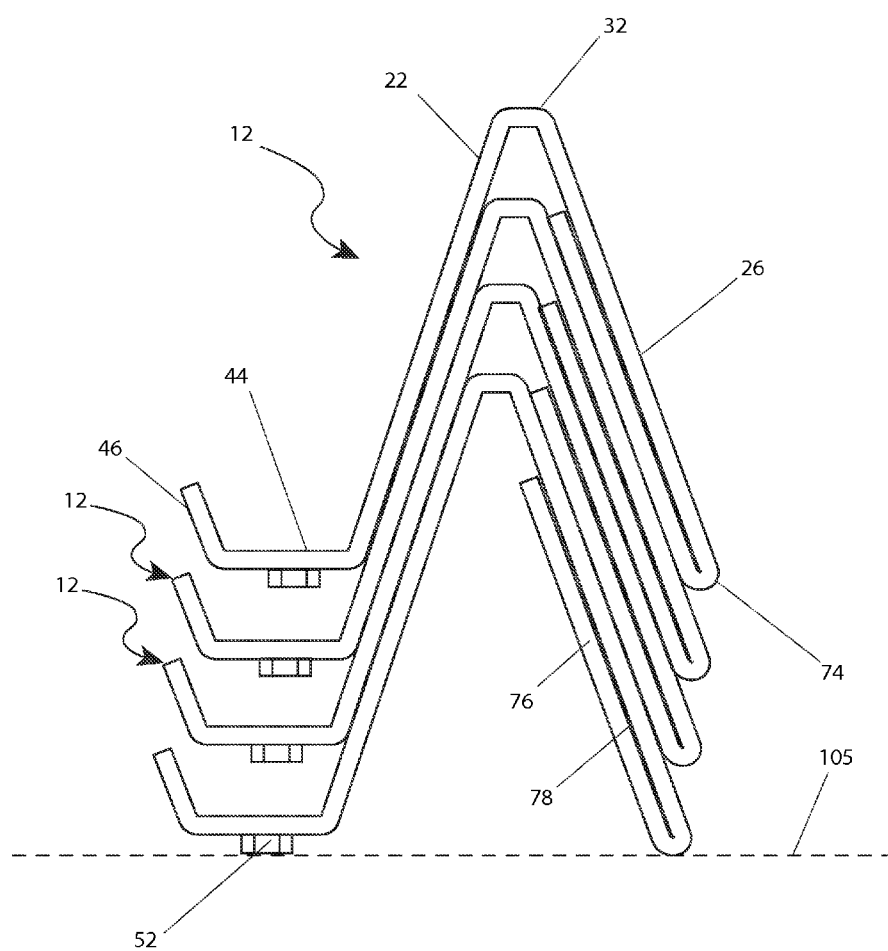

The best mode for carrying out the invention is presented in terms of its preferred embodiment, herein depicted within FIGS. 1 through 4, and an alternate embodiment, herein depicted within FIGS. 5 and 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a mobile telephone holder and display stand (herein referred to as the "device") 10, which provides a means to elevate an unattended mobile telephone 100 from a horizontal surface 105 to protect said mobile telephone 100 from any fluids which may be puddling on said horizontal surface 105. The device may also be used to orient the mobile telephone 100 at a preset viewing angle in order for a user to see the display without holding said mobile telephone 100. The horizontal surface 105 may be the upper surface of any horizontal plane such as a table top, counter top, or the bar top of a drinking establishment or ale house.

Figure 2:
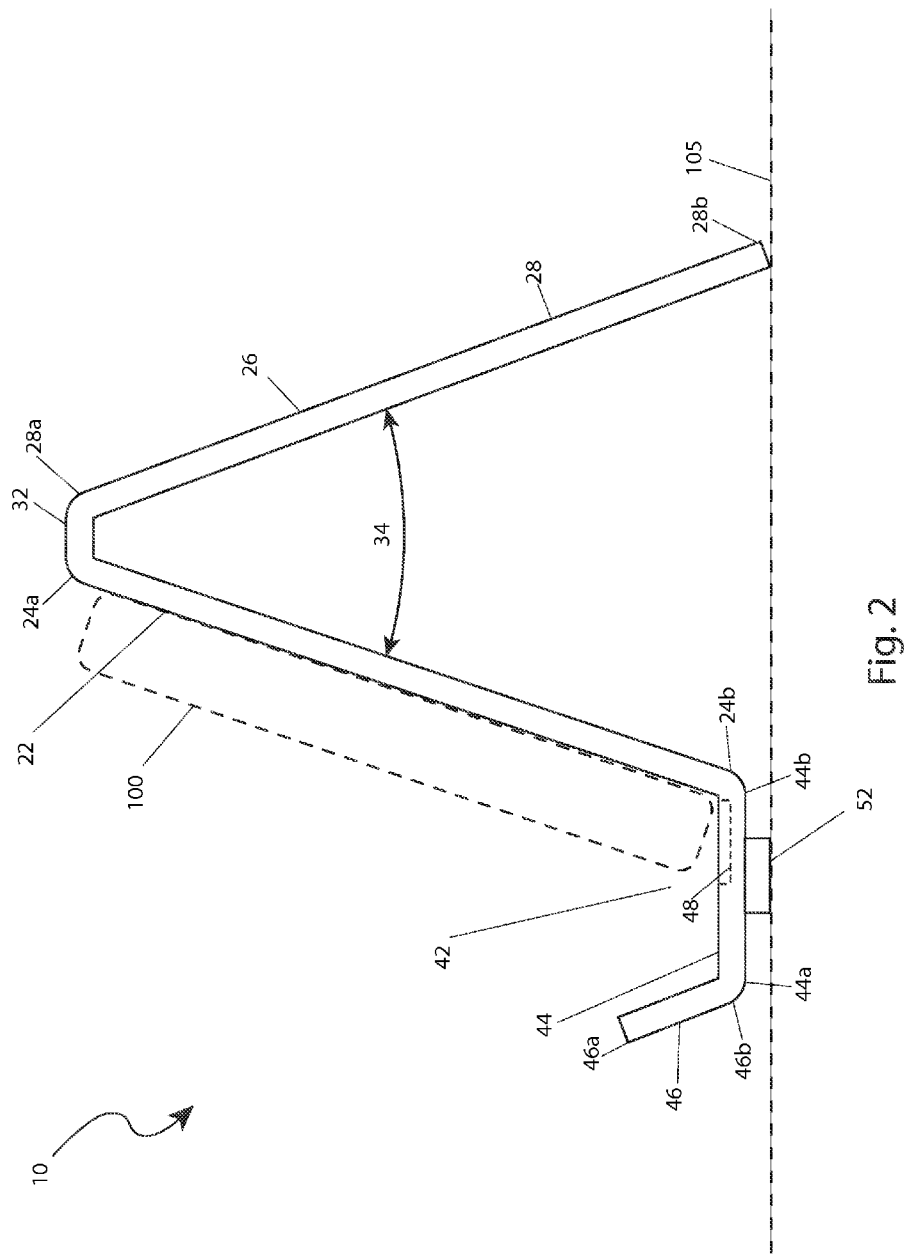
FIG. 2 is a side elevation view of the mobile telephone holder and display 10 in accordance with the preferred embodiment of the present invention.
Figure 3:
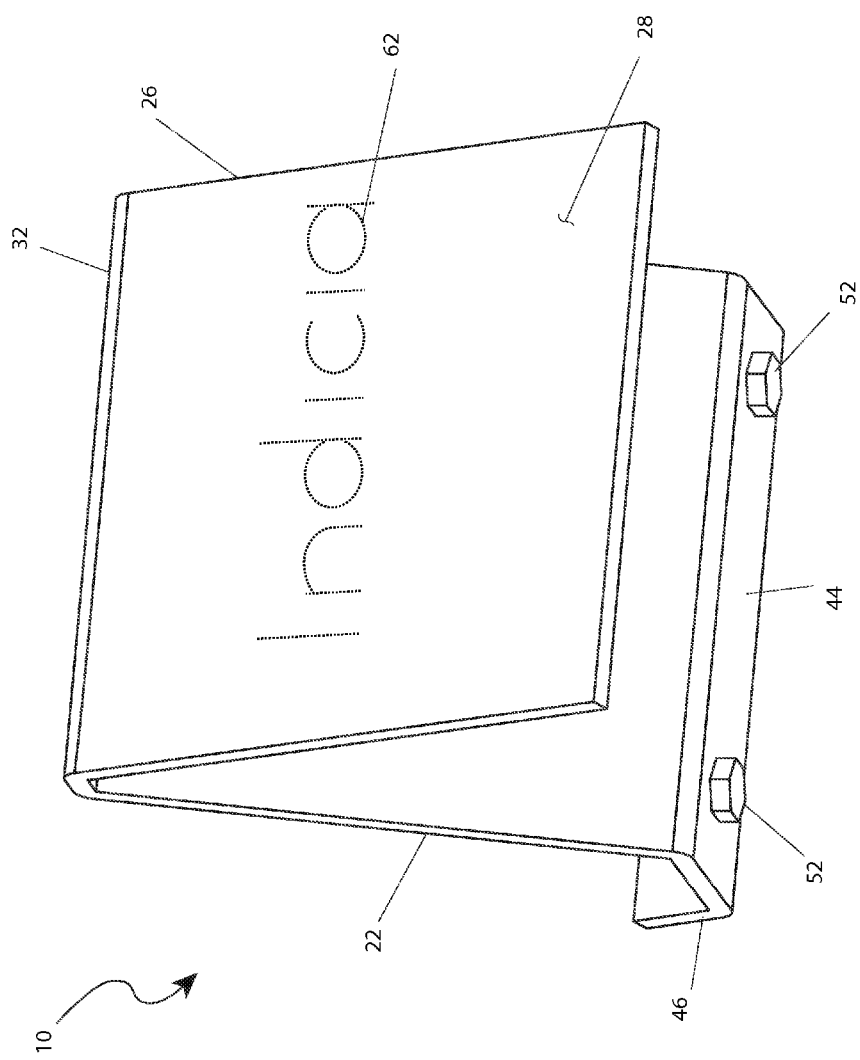
FIG. 3 is another perspective view of the mobile telephone holder and display 10 in accordance with the preferred embodiment of the present invention.

Referring now to FIGS. 1 and 2, a perspective and side view respectively of the device 10, according to the preferred embodiment of the present invention, is disclosed. The device 10 is comprised preferably of polymethyl methacrylate, or other similar materials, which can further be modified to add a variety of colors to said device 10. It should be appreciated that the device 10 may defined as a singular monolithic main body piece that is operatively formed into a specific shape, or comprise a series of individual elements, separately formed and operatively joined to arrive at the shape of the device indicated herein.

The device 10 is comprised of a front face 24 set on an angular first plane 22 and a back face 28 set on an angular, converging second plane 26. The front face 24 has an upper end 24a and a lower end 24b. The back face 28 has an upper edge 28a and a lower edge 28b. As indicated in the figures, a horizontal bridge 32 is disposed between the upper edge 24a of the front face 24 and the upper edge 28a of the back face 28. It should be appreciated that other embodiments of the present device 10 may be constructed without a bridge 32, such that the upper edge 24a of the front face 24 and the upper edge 28a of the back face 28 are directly connected, or with bridges of varying widths, without changing the scope of this device 10.

The first plane 22 is oriented at an acute angle from the horizontal, indicated at 105. In the preferred embodiment the angle is set greater than sixty degrees) (60°). The second plane 26 is likewise oriented at an acute angle from the horizontal 105 such that a support angle 34 is created relative to the first plane 22. The support angle 34 set between the first plane 22 and the second plane 26 is preferably between forty degrees (40°) and fifty degrees (50°). It is envisioned that the face 24 of the first plane 22 may comprise various face indicia 61 which may provide script or logos based upon a preference, and may include images such as, but not limited to, business names/logos, personal names, symbols, lines, pictures, and the like, in various colors and patterns, to further customize and personalize the device 10.

The device 10 further comprises a horizontal rectangular sill 44 having a front edge 44a and a rear edge 44b and a rectangular reveal 46 having a front edge 46a and a rear edge 46b. The rear edge 44b of the sill 44 being operatively joined to the lower edge 24b of the front face 24 and the front edge 44a of the sill 44 being operatively joined to the rear edge 46b of the reveal 46. In this manner, a trough 42 is produced, comprised of the front face 24, the horizontal sill 44, and the reveal 46. The trough 42 is meant to receive the lower end of a mobile telephone 100 while the back of said mobile telephone or device 100 is supported upon the front face 24. Although indicated a having an upswept, or generally acute angle from the horizontal 105, it should be appreciated that the reveal 46 may in some embodiments be perpendicular to the sill 44. Similarly, to enhance the manner in which a mobile device 100 is retained in the trough 42, the sill mat be angled upward slightly from the horizontal and/or the sill 24 may be provided with a slot 48 or apertures in various configurations.

Disposed upon a lower surface of the sill 44 is a plurality of pads 52 preferably comprised of nitrile, or a similar material, and attached with an adhesive. The purpose of the pads 52 is to increase the friction force between the device 10 and the horizontal surface 105 upon which the device 10 is placed so as to resist motion in the eventuality that a user would depress a key or contact a touch screen of the mobile device 100. The geometry of the device 10 as previously described would permit a plurality of the devices 10 to be easily stacked as shown in FIG. 4 to await use by one (1) or more users with mobile devices 100.

Referring again to FIGS. 1, and 3, and particularly the front face 24 and the back face 28, it is envisioned that the surface of the front face 24 and the back face 28 may comprise various back indicia 61 and 62, respectively, which may provide script or logos based upon a preference and may include images such as, but not limited to, business names/logos, personal names, symbols, lines, pictures, and the like, in various colors and patterns, to further customize and personalize the device 10.

Referring now to FIG. 5, a perspective view of the device 12, according to an alternate embodiment of the present invention, is disclosed. The alternate embodiment of the device 12 is comprised of the preferred embodiment of the device 10, which comprises a back keep face 78 set on a third plane 76 which is adjacent to, and attached to the back face 28 by means of a fold 74. The fold 74 is comprised of an approximately one hundred eighty degree (180°) bend in the material of the back keep face 78 and sets a minimal, non-zero distance between the back face 28 and the back keep face 76 by the minimum bend radius that is achievable in the constituent material. The physical non-zero distance between the back face 28 and the back keep face 78 is the keep 78*a*. The constituent material in this alternate embodiment of the device 12 is preferably a clear thermoplastic material such as polymethyl methacrylate. The purpose of the keep 78*a* is for the deposition and retention of printed material, photographs, or other decorative material as suits the taste of the user or the provider of the device. The geometry of the device 12 permits a plurality of the devices 12 to be easily stacked as shown in FIG. 6 to await use by one or more users with mobile devices 100.

The preferred embodiment of the present invention can be utilized by the enabled user in a simple and straightforward manner with little or no training. After initial purchase or acquisition of the device 10, it would be configured as indicated in FIG. 1. The method of installing and utilizing the device 10 may be achieved by performing the following steps: acquiring a model of the device 10 having the desired style to suit the taste of the user; placing the device 10 on a level horizontal surface 105: inserting a mobile device 100 in the trough 42 of the device 10 and leaning the back of said mobile device 100 against the front face 24. The mobile device 100 is now ready for hands-free viewing, or benign neglect awaiting the whim of the user in a securely elevated position above the horizontal surface 105.

The method of utilizing the alternate embodiment of the device 12 may be achieved by performing the following steps: acquiring a model of the device 12 having the desired style to suit the taste of the user; placing printed material, a photograph, or other decorative material into the keep 78*a*; placing the device 10 on a level horizontal surface 105: inserting a mobile device 100 in the trough 42 of the device 12 and leaning the back of said mobile device 100 against the front face 24.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A mobile device holder and display system comprising:
   a rectangular front face element having an upper end, a lower end, and a planar front face support surface, said front face element disposed on a first plane wherein said first plane is oriented at an acute first angle relative to a horizontal plane;
   a rectangular back face element having an upper end and a lower end, wherein said back face element is disposed on a second plane, and wherein said second plane is oriented at an acute second angle relative to the horizontal plane;
   a bridge element having a flat too surface directly connected to said upper end of said front face element and said upper end of said back face element such that the flat top surface defines a maximum height of the mobile device holder; wherein said front face element with said back face element forms a support angle in cross-section there between;
   a rectangular sill element having a front edge, a rear edge, and a planar sill support surface extending between said front edge and said rear edge of said sill element, wherein said sill element is disposed horizontally in cross section and said rear edge of said sill element is operatively joined to said lower end of said front face element at an obtuse angle;
   a rectangular reveal element having a front edge, a rear edge, and a reveal support surface, wherein said rear edge of said reveal element is operatively joined to said front edge of said sill element and said reveal element is disposed at an upward acute angle relative to the horizontal plane as viewed from a side of said mobile device holder; and,
   a trough defined by said sill, said reveal, and said lower end of said front face element;
   a plurality of pads disposed upon the bottom of said sill member;
   a slot formed in said planar sill support surface of said sill element, wherein said slot comprising generally a rectangular-shaped cross-section wherein said slot is adapted to accept and retain a portion of said lower end of said mobile device such that said bottom surface of said mobile device is held securely in a fixed position upon said planar sill support surface; and,
   a back keep face member having a lower end and an upper end, wherein said lower end of said back keep face is operatively attached to said lower end of said back face member and set immediately adjacent to said back face member thereby defining a back keep in close proximity to said back face to allow insertion of printed materials, wherein said back keep face member is positioned between the front face element and the back face element, wherein the upper end of the back keep face member is positioned below the upper end of the back face element; wherein a fold portion directly connected to the lower end of the back face element and the lower end of the back keep face member wherein:
   said trough is configured to receive a lower portion of a mobile device such that at least a portion of a back surface of said mobile device is in contact with and supported by said planar front face support surface and at least a portion of a bottom surface of said mobile device is in contact with and supported by said planar sill support surface; and
   said reveal support surface is configured to limit a forward most position of said bottom surface of said mobile device upon said planar sill support surface
   wherein said mobile device holder and display system is a singular monolithic main body.

2. The mobile device holder and display system of claim 1, wherein said first plane is oriented at an angle greater than sixty degrees from horizontal.

3. The mobile device holder and display system of claim 1, wherein said support angle is between forty degrees and fifty degrees.

4. The mobile device holder and display system of claim 1, wherein said sill member comprises a horizontal crosssectional dimension suitable to allow said device to support a plurality of mobile device holder and display device in a stacking arrangement.

* * * * *